United States Patent
Haberle et al.

[11] 4,117,267
[45] Sep. 26, 1978

[54] SYSTEM FOR TWO-WAY COMMUNICATION BETWEEN A MASTER STATION AND A PLURALITY OF SUBSTATIONS VIA A SATELLITE

[75] Inventors: Heinz Haberle, Herrsching; Richard Aubele, Stuttgart, both of Germany

[73] Assignee: International Standard Electric Corporation, New York, N.Y.

[21] Appl. No.: 781,911

[22] Filed: Mar. 28, 1977

[30] Foreign Application Priority Data

Apr. 8, 1976 [DE] Fed. Rep. of Germany ....... 2615198

[51] Int. Cl.² .................................................. H04J 3/06
[52] U.S. Cl. ..................................... 179/15 BS; 325/4
[58] Field of Search .............. 179/15 BS, 15 BA; 325/4; 343/100 ST

[56] References Cited

U.S. PATENT DOCUMENTS

| | | | |
|---|---|---|---|
| 3,566,267 | 2/1971 | Golding | 179/15 BS |
| 3,761,813 | 9/1973 | Perrin | 179/15 BS |
| 3,818,453 | 6/1974 | Schmidt et al. | 179/15 BS |
| 3,858,007 | 12/1974 | Ganssmantel | 179/15 BS |
| 3,982,075 | 9/1976 | Jefferis et al. | 179/15 BS |
| 4,001,690 | 1/1977 | Mack et al. | 179/15 BS |
| 4,004,225 | 1/1977 | Ganssmantel | 179/15 BS |

*Primary Examiner*—Douglas W. Olms
*Attorney, Agent, or Firm*—John T. O'Halloran; Alfred C. Hill

[57] ABSTRACT

A system for communication between aircraft and a ground control center via a satellite. Information is transmitted in bursts from all the aircraft to the ground control center on a time division multiple access basis in a first radio frequency channel common to all of the aircraft and information is transmitted from the ground control center to the aircraft on a second radio frequency channel different than the first radio frequency channel. The time division multiple access bursts transmitted by the aircraft are synchronized in a particularly simple manner by the ground control center by transmitting a reference frame sync signal on the second radio frequency channel.

3 Claims, 4 Drawing Figures

SYSTEM FOR TWO-WAY COMMUNICATION BETWEEN A MASTER STATION AND A PLURALITY OF SUBSTATIONS VIA A SATELLITE

BACKGROUND OF THE INVENTION

The present invention relates to a system for two-way communication between a master station and a plurality of substations via a satellite acting as a transponder wherein the transmission of information from the substation to the master station takes place in a time division multiple access (TDMA) mode, with each substation transmitting its information to the satellite in the form of periodic bursts on a radio-frequency channel common to all substations, and fixing the instants of its burst transmissions with respect to the instant of reception of a reference frame sync signal transmitted from the master station to all substations via the satellite.

A communication system of this kind is known, for example, from U.S. Pat. No. 3,742,498. In that system, the TDMA frame contains the bursts from the substations and from the master station and the reference frame sync signal or reference burst additionally transmitted by the master station. Each substation receives from the master station the reference frame sync signal and the data transmitted within that time slot of the TDMA frame assigned to the main station as far as this data is addressed to one of the substations. The system is suited to two-way communication between a ground control center and a plurality of aircraft via a satellite, but requires expensive synchronization equipment on the ground and aboard the aircraft because the constantly changing distances between the satellite and the aircraft have to be taken into account during synchronization to prevent time overlapping of the burst of the TDMA frame at the satellite. Correspondingly expensive equipment is required in this system to permit non-interfering first access by an aircraft.

If the positions of the aircraft are to be determined using conventional navigation equipment instead of such an aircraft-satellite-ground control center communication system, and if the amount of information transmitted is not so large that only short guard times between the different bursts on the order of one microsecond ($\mu$s) are possible, a simpler communication system will be sufficient to handle the data to be exchanged between a ground control center and a plurality of aircraft for the purpose of air-traffic control.

SUMMARY OF THE INVENTION

It is therefore the object of the present invention to provide a simplified system for two-way communication between any one of a plurality of substations and a master station which system requires no expensive equipment for distance measurement and for the first access by a substation.

A feature of the present invention is the provision of a system for two-way communication comprising: a master station; a plurality of substations being in two-way communication with the master station via a satellite acting as a transponder, each of the plurality of substations transmitting information to the master station in a time division multiple access mode and each of the plurality of substations transmitting its associated information to the satellite in the form of periodic bursts on a first radio frequency channel common to all of the plurality of substations, the instant of the bursts of each of the plurality of substations being fixed with respect to the instant of reception of a reference frame sync signal transmitted from the master station to all of the plurality of substations via the satellite; and the master station transmits its information intended for the plurality of substations to the satellite together with the reference frame sync signal on a second radio frequency channel different than the first radio frequency channel.

The communication system according to the present invention is suitable both for an orbiting satellite and for a synchronous satellite.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
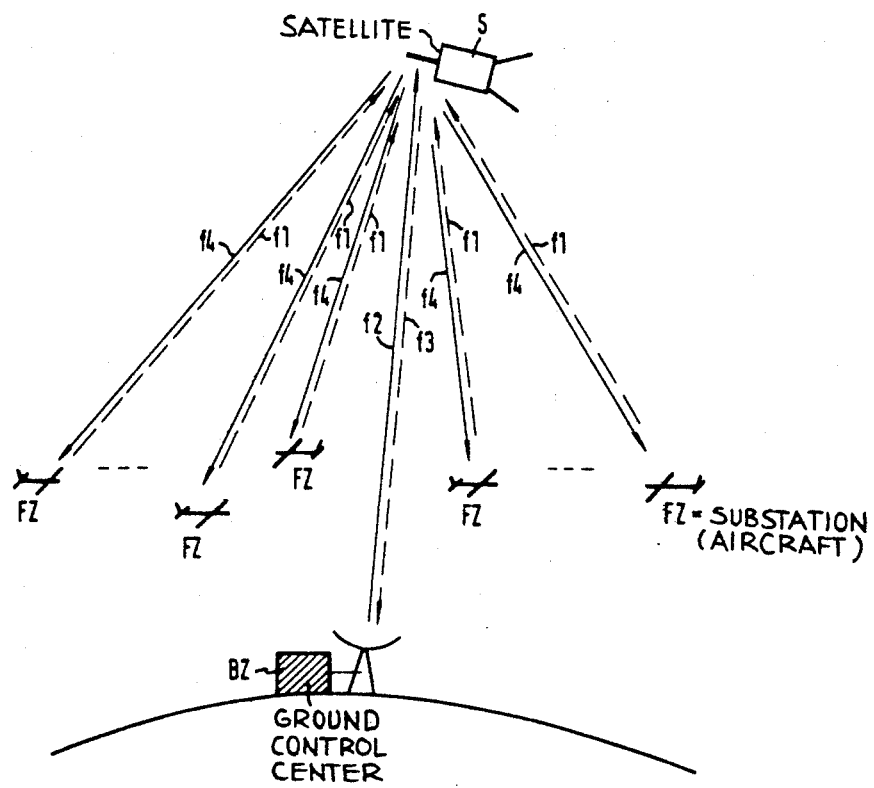
FIG. 1 shows the system configuration of the communication system according to the principles of the present invention.

FIG. 1 shows a communication system with a satellite S, a ground control center BZ as the master station, and several aircraft FZ as substations. Communication in the two opposite directions, aircraft to satellite to ground control center and ground control center to satellite to aircraft, takes place on two paths independent of one another. One path, shown by broken lines, is a simplified time division multiple access path in which all aircraft FZ only transmit, while the ground control center BZ only receives. The aircraft transmit their data to the satellite S on a frequency $f1$ in the form of periodic bursts, with the instants of transmission of the individual aircraft so shifted with respect to each other that their bursts will not overlap in time at the satellite S. This frequency $f1$ is converted in the satellite into a frequency $f3$ which is received not by the aircraft, but only by the ground control center.

The other path, shown by the solid lines, serves to transmit data from the ground control center BZ via the satellite to the aircraft FZ. The ground control center BZ transmits its data to the satellite S continuously on a frequency $f2$ different from the transmitting frequency $f1$ of the aircraft. The satellite converts this frequency $f2$ to a frequency $f4$ and transmits it to the aircraft FZ. This data is, on the one hand, so-called short-term data, which is addressed to the individual aircraft, and, on the other hand, so-called long-term data such as weather situation, flight plan, etc., which is addressed to all aircraft. The data is arranged in a given, periodically recurring sequence, so that a frame structure is obtained. If the number of aircraft FZ involved is 120, for example, this frame will be assumed to have a duration of 10 $\mu$s.

Such a communication system consisting of two separate paths has the advantage of permitting a particularly simple synchronization of the TDMA frame of the aircraft. In any TDMA system, the subscribers need a common timing signal such as a reference frame sync signal to mark the start of the frame. Relative to the instant of reception of this frame sync signal, the subscribers determine their instants of transmission on the basis of the respective time slot assigned to them within the TDMA frame. The sequence of the aircraft in their transmitted TDMA frame is advantageously fixed in accordance with the sequence of the aircraft in the frame transmitted by the ground station. In the communication system according to this invention, the ground control center BZ transmits the reference frame sync signal to all aircraft FZ on the same frequency as the data to be transmitted by it. In the simplest case, the ground control center marks the start of its frame with a start-of-frame flag, and the aircraft use this received start-of-frame flag as a reference frame sync signal to synchronize their bursts within the TDMA frame. In this case, therefore, the TDMA frame of the aircraft has a duration of 10 μs, too.

The time slot for the burst transmission, i.e., the position within the TDMA frame, is communicated to the individual aircraft in the form of an identification number together with the data addressed to this aircraft.

Between the bursts of the aircraft, guard times are provided which are so long that the differences in signal delay resulting from different and constantly changing distances between the various aircraft and the satellite are covered, and that in the satellite the bursts of the different aircraft do not overlap in time.

Figure 2:
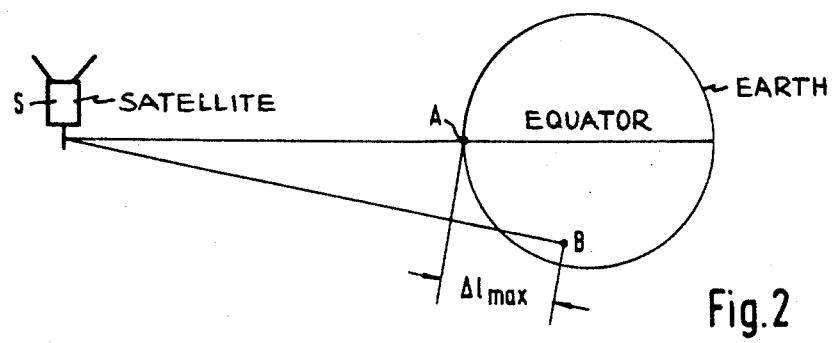
FIG. 2 is a sketch explaining the maximum differences in signal delay.

The maximum possible difference in delay between the bursts of two aircraft on the way to the satellite S as a result of the movement of the aircraft will now be explained with the aid of FIG. 2. Two aircraft A and B will be considered which are flying at the same altitude, one aircraft A at the subsatellite point, i.e. vertically below the satellite S, and the other aircraft B on the border of the area covered by the satellite. With a synchronous satellite covering a circular area with a radius of 80° of longitude, measured at the equator, the difference in signal delay between the paths S to A and S to B, which differ by $\Delta 1_{max}$, is approximately 23 ms (milliseconds). The reference frame sync signal transmitted from the satellite S to the two aircraft A and B reaches the aircraft B 23 ms later than the aircraft A. The burst then transmitted from the aircraft B again needs 23 ms longer than the burst of the aircraft A to reach the satellite S, so a guard time between successive bursts of 46 ms, i.e. of twice the maximum difference in signal delay, is required at the satellite because of the uncertainty of the position of the aircraft. In addition to these guard times conditioned only by the movement of the aircraft, guard times are required because of the movement of the satellite. Here, a distinction must be made between a synchronous satellite and an orbiting satellite. For a synchronous satellite such as the Orbital Test Satellite (OTS) it can be shown that the guard times required as a result of its position uncertainty are of the order of microseconds. Thus, compared to the 46-ms guard times required because of the aircraft movement, they are negligible.

With an orbiting satellite, however, the absolute signal delay to the earth varies with the respective orbital position within wide limits. For the Soviet satellite "Molnija", for example, the variation in signal delay within the range of visibility is about 100 ms. However, the communication system according to the present invention has the advantage that absolute time delays and their variations need not be taken into account in proportioning the guard times between the bursts in the TDMA frame, but only the relative variations in burst delay on the different paths between the individual aircraft. Thus, the movement of the satellite has no appreciable effect on the guard times, so the invention is also applicable to orbiting satellites.

This advantage over known TDMA systems will be explained hereinbelow.

In known TDMA systems, the frame sync signal is transmitted to the individual subscribers within the TDMA frame and forms the start of the frame. Viewed from the individual subscribers, it represents at the satellite an absolute, periodically recurring time mark. The instant the burst following this time mark arrives at the satellite is subject to an uncertainty which is equal to twice the variation of the absolute signal delay on the path between the satellite and the station transmitting the burst. The variation in signal delay influences, on the one hand, the transmission of the reference frame sync signal from the satellite to the station and, on the other hand, the subsequent transmission of the station burst to the satellite, so that in the TDMA frame at the satellite a guard time equal to twice the delay variation is required between the reference frame sync signal and the adjacent burst. With the aforementioned variation in signal delay of $\Delta t = 100$ ms, caused only by the movement of the orbiting satellite, this guard time is $$T_{SR} = 200 \text{ ms} + 46 \text{ ms} = 246 \text{ ms}.$$

Between any two other successive bursts $i$ and $j$, however, only a guard time $T_{SB}$ is required which is equal to twice the difference between the delay variation $\Delta ti$ and $\Delta tj$ of the bursts $i$ and $j$. Hence, $$T_{SB} = 2 \, |\Delta ti - \Delta tj|$$

As a more exact investigation shows, this guard time $T_{SB}$ based on relative delay variations is hardly greater than the value for the synchronous satellite, whose movement, compared to the aircraft movement, is negligible. Thus, for the orbiting satellite "Molnija", too, the guard time is approximately $$T_{SB} = 46 \text{ ms}.$$

The advantage of the novel communication system lies in the fact that the TDMA frame of the aircraft includes only equal guard times $T_{SB}$, because the reference frame sync signal is transmitted outside the TDMA frame and, therefore, no guard spaces $T_{SR}$ to the adjacent bursts are required.

Figure 3:
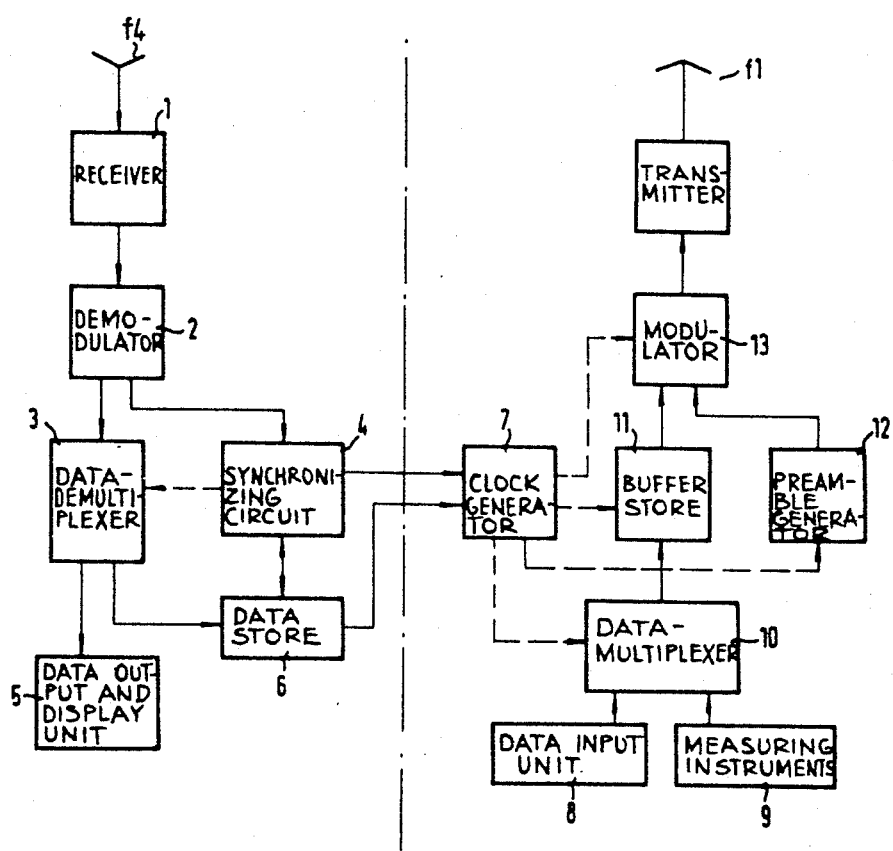
FIG. 3 is a block diagram of a substation for the communication system according to the principles of the present invention.

FIG. 3 shows a block diagram of the aircraft on-board equipment for the communication system according to the principles of the present invention. The data frame received in each aircraft from the ground control center is applied via a receiver 1 and a demodulator 2 as a baseband signal to a data demultiplexer 3. A synchronizing circuit 4 derives from the baseband signal the frame repetition rate and the bit rate. Controlled at the bit rate, the data demultiplexer 3 extracts the data addressed to the aircraft and the long-term data and passes them on to a data output and display unit 5. The identification number, which is part of the data addressed to the aircraft, is stored in a data store 6 and used to preset a counter (not shown) in a clock generator 7 at the transmitting end. This counter counts from the start of the frame to the identification number at the received bit rate and thus determines the aircraft's instant of transmission relative to the start of the frame. The data to be transmitted from the aircraft is fed in digital form from the output of a data input unit 8 or from the output of measuring instruments 9 to a data multiplexer 10 which forms the data word to be transmitted. This data word is stored in a buffer store 11 which applies the data word in compressed form to a modulator 13 subsequent to the preamble, which is generated by a preamble generator 12 and must immediately precede the data word for effecting the bit-rate and, if necessary, carrier synchronization of the receiver of the ground control center. Modulator 13 is switched on only for the time of transmission. The clock signals necessary to control the sequence of operations at the transmitting end are applied from the clock generator 7 to the units 10 to 13 over clock signal lines (shown as broken lines).

The output signal of the modulator 13 finally reaches the aircraft's transmitter 14, which transmits the burst to the satellite on the transmitting frequency $f1$ common to all aircraft.

The burst transmission can be controlled even more directly by the ground control center. In an embodiment not shown, the ground control center transmits the burst transmission directly in the form of a data word addressed to the aircraft. Recognition of this data word causes the clock generator at the transmitting end to transmit the burst directly. This eliminates the need for the data store 6 for storing the identification number, and the airborne equipment is reduced to the minimum of a data transmitting station remotely controlled by the ground control center.

Figure 4:
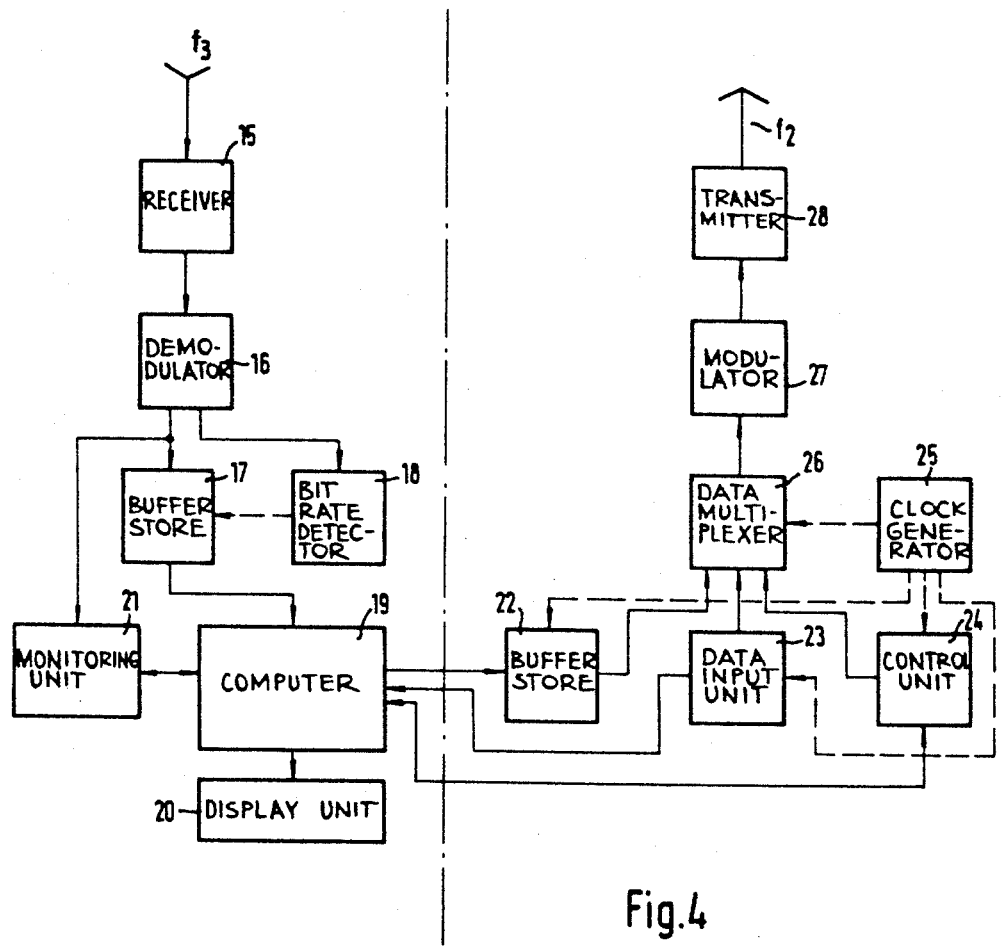
FIG. 4 is a block diagram of the master station for the communication system according to the principles of the present invention.

A block diagram of the ground control center is shown in FIG. 4. The bursts received from the various aircraft are applied from a receiver 15 through a demodulator 16 to a buffer store 17. The bit rate of the received bursts is derived in a bit rate detector 18 from the output signal of the demodulator 16. The buffer store passes the data as a continuous data stream to a computer 19. From there, the data is applied to a display unit 20. A monitoring unit 21 which receives the output signal of the demodulator 16 checks the time-division multiplex process in the satellite and is connected with the computer 19. The computer is connected with a buffer store 22, a data input unit 23, and a control unit 24 which receives the clock signals of a clock generator 25. The output signals of the buffer store 22, the data input unit 23, and the control unit 24 are applied to a data multiplexer 26 which is also supplied with clock signals from the clock generator and composes the signal to be transmitted. The computer 19, together with the control unit 24 at the transmitting end, controls the system's sequence of operation, with the control unit 24 taking care of the consecutive frame marking and of the assignment of the identification number to the data addressed to the different aircraft. The output signals of the data multiplexer 26 are then fed through a modulator 27 to the transmitter 28 which transmits them to the satellite on a frequency $f2$ which is different from the airplanes' common transmitting frequency $f1$.

The following describes an improvement of the invention which makes it possible to use considerably shorter guard times. Shorter guard times are necessary where the number of aircraft is considerably increased, e.g. to 240, because with unchanged frame duration, the guard times would leave no time for the transmission of the information. The guard times must also be shortened when system efficiency is to be improved with the number of aircraft remaining unchanged. The additional expenditure for such a system is small. The ground control center continuously receives position reports from the aircraft. The computer calculates from these reports the distances and the corresponding values of the signal delays, and the ground control center communicates to the aircraft the corrected instants of transmission. Thus, the continuous readjustment of the instants of transmission is controlled fully automatically from the ground control center. The counter which determines aboard the aircraft the instant of transmission relative to the start of the frame with the aid of the identification number communicated to it is set anew by means of a corrected identification number. As mentioned above, the data of each vehicle may also be interrogated directly with a command from the ground control center. In this case, too, the guard times can be reduced if the ground control center adapts the instant of transmission of the command to the respective distances.

Thus, the differences in signal delay resulting from the movement of the aircraft have been compensated for, and the only purpose of the guard time is to cover the relative delay variations caused by the movement of the satellite. Calculations have shown that, both for a synchronous satellite and for an orbiting satellite, for which the delay variations as a result of the movement on the elliptical orbit are known to the ground center and can be largely compensated for. Guard times of about 350 $\mu$s are sufficient in this case. These already include a sufficient allowance for inaccuracies. By these corrections to be performed by the ground control center, the guard times can thus be reduced by a factor of 100, whereby system capacity is considerably increased.

While we have described above the principles of our invention in connection with specific apparatus it is to be clearly understood that this description is made only by way of example and not as a limitation to the scope of our invention as set forth in the objects thereof and in the accompanying claims.

We claim:

1. A system for two-way communication comprising:
   a master station;
   a plurality of substations being in two-way communication with said master station via a satellite acting as a transponder, each of said plurality of substations transmitting information to said master station in a time division multiple access mode and each of said plurality of substations transmitting its associated information to said satellite in the form of periodic bursts on a first radio frequency channel common to all of said plurality of substations, the instant of said bursts of each of said plurality of substations being fixed with respect to the instant of reception of a reference frame sync signal transmitted from said master station to all of said plurality of substations via said satellite; and
   said master station transmits its information intended for said plurality of substations to said satellite together with said reference frame sync signal on a second radio frequency channel different than said first radio frequency channel.

2. A system according to claim 1, wherein
   said master station includes
      first means to provide information addressed to each of said plurality of substations to assign different instants of transmission of said bursts from each of said plurality of substations.
3. A system according to claim 2, wherein each of said plurality of substations include second means to control the transmission of its associated burst in response to information received from said master station and to lock the transmitted bit rate to said master station.

* * * * *